US 8,905,351 B2

(12) United States Patent
Buscher et al.

(10) Patent No.: US 8,905,351 B2
(45) Date of Patent: Dec. 9, 2014

(54) AIRFRAME

(75) Inventors: Michael Sean Buscher, Conroe, TX (US); Henry E. Kulesza, The Woodlands, TX (US)

(73) Assignee: Vanguard Defense Industries, LLC, Spring, TX (US)

( * ) Notice: Subject to any disclaimer, the term of this patent is extended or adjusted under 35 U.S.C. 154(b) by 357 days.

(21) Appl. No.: 13/286,897

(22) Filed: Nov. 1, 2011

(65) Prior Publication Data

US 2013/0105628 A1    May 2, 2013

(51) Int. Cl.
 *B64C 1/00* (2006.01)
 *B64C 39/02* (2006.01)
 *B64D 47/08* (2006.01)

(52) U.S. Cl.
 CPC .............. *B64C 39/024* (2013.01); *B64D 47/08* (2013.01); *B64C 2201/108* (2013.01); *B64C 2201/024* (2013.01); *B64C 2201/127* (2013.01)
 USPC ........................................ 244/119; 244/118.1

(58) Field of Classification Search
 CPC ...... B64C 1/061; B64C 27/04; B64C 39/024; B64C 2201/027; B64C 2201/127; B64C 27/001; B64C 2211/00; B64C 17/10; B64C 7/00
 USPC ............. 244/17.11, 119; 344/144; 396/12, 13
 See application file for complete search history.

(56) References Cited

U.S. PATENT DOCUMENTS

| | | | | |
|---|---|---|---|---|
| 5,497,960 | A * | 3/1996 | Previnaire | 244/17.11 |
| 5,752,088 | A * | 5/1998 | Desselle | 396/12 |
| 6,270,038 | B1 * | 8/2001 | Cycon et al. | 244/12.3 |
| 6,491,255 | B1 * | 12/2002 | Bracken et al. | 244/135 R |
| 6,581,872 | B2 * | 6/2003 | Walmsley | 244/12.2 |
| 2002/0109044 | A1 * | 8/2002 | Rock | 244/17.23 |
| 2003/0066932 | A1 * | 4/2003 | Carroll | 244/120 |
| 2005/0081708 | A1 * | 4/2005 | O'Dwyer | 89/37.16 |
| 2006/0113425 | A1 * | 6/2006 | Rader | 244/17.11 |
| 2006/0266880 | A1 * | 11/2006 | Chen | 244/17.11 |
| 2007/0023566 | A1 * | 2/2007 | Howard | 244/2 |
| 2009/0050733 | A1 * | 2/2009 | Pattakos et al. | 244/17.11 |

* cited by examiner

*Primary Examiner* — Christopher P Ellis
*Assistant Examiner* — George Andonyan
(74) *Attorney, Agent, or Firm* — Fletcher Yoder P.C.

(57) ABSTRACT

The disclosure describes airframe systems. In one embodiment, an airframe system includes a first side wall and a second side wall. The airframe system further includes a drive train platform configured to carry an aircraft drive train and to attach the first side wall parallel to the second side wall. The airframe system additionally includes a first structural rod configured to attach the first side wall parallel to the second side wall, and a second structural rod positioned aft of the first structural rod and configured to attach the first side wall to parallel to the second side wall. The first and second structural rods are configured to carry a camera mount.

19 Claims, 5 Drawing Sheets

AIRFRAME

BACKGROUND

The present disclosure relates generally to airframes and, more particularly, to unmanned aircraft system (UAS) airframes.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A variety of situations exist in which a UAS may be desired. For example, a UAS may be used to assist law enforcement, to spot forest fires, to report vehicular traffic, and more generally, to be used as a remote observation platform for intelligence, surveillance, and reconnaissance (ISR) operations. The UAS may include an airframe typically designed to enclose a power train and related flight components. In some UAS, a camera system may used. For example, a fixed wing or rotary wing unmanned aircraft system (UAS) may include a camera system providing a high definition (HD) video camera. The UAS may be directed to a locality of interest and used to provide images and video observations from the locality. In this manner, suitable visual observations may be obtained, without the need to place a human in harm's way.

One difficulty that arises with aerially-conveyed camera systems is the change in handling of the UAS as well as the extra weight associated with attaching the camera mount and fuel tanks to the UAS. Such changes may reduce the operational effectiveness of the UAS and may require additional retraining by the human operator to account for the different handling of the UAS caused by the camera mount and fuel tank. In particular, camera systems capable of higher resolution imagery may be heavy, and may have a more pronounced effect on the flight characteristics of the UAS. There is a need, therefore, for an improved airframe suitable for conveying a camera mount and a fuel tank, while maintaining efficient flight characteristics of the UAS.

DETAILED DESCRIPTION OF SPECIFIC EMBODIMENTS

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

This disclosure provides a novel airframe suitable for use in aircraft, such as an unmanned aircraft system (UAS). The airframe may include structural features for use in mounting a variety of camera systems securely, including high resolution camera systems, while minimizing weight and improving maintainability of the camera system and UAS. Additionally, the airframe may include features useful for improving UAS performance and mission capabilities, such as providing for the attachment of an internal, centerline fuel tank. The fuel tank may improve fuel carrying capacity and include features such as internal baffling, useful in minimizing fuel "slosh" while providing for additional protection against projectile penetration.

The UAS airframe may be included in a rotary wing aircraft, such as a helicopter UAS. The UAS may be capable of engaging targets, in addition to or alternative to providing for intelligence, surveillance, and reconnaissance (ISR) operations. Additionally, the UAS airframe may be provided in a compact size, such as a size suitable for transporting the UAS in a sports utility vehicle (SUV) and/or mid-size pickup truck. Indeed, the UAS may be sized to be easily transported to a desired locality without resorting to a special transport vehicle. Accordingly, the UAS airframe may include features useful in minimizing weight while providing for a structural support sufficient to carry the camera load and withstand weapons fire recoil.

In one example, the airframe may include structural support members suitable for performing multiple functions, such as providing rigidity and carrying a camera mount. The structural support members may be additionally used to attach two airframe side walls, as described in more detail below. The side walls may include certain features, such as "skeletonized" openings, that minimize the weight of the airframe. The camera mount may be used to mount a gimbal system, such as a gimbal system that may be remote controlled. For example, the gimbal system may be remote controlled to position a camera system included in the gimbal system into an orientation suitable for capturing images of interest, providing targeting information, and so on.

The airframe may include features suitable for attaching a center line fuel tank. For example, a high fuel capacity tank may be attached to the airframe and used to provide for additional flight time and/or to increase the operational range of the UAS. The airframe may also include attachment points that enable a variety of landing systems to be used. Such landing systems may include skids, pontoons, wheeled systems, and the like, capable of efficiently landing the UAS in a variety of land and water environments.

By providing for a lightweight airframe with integrated load-bearing support for a camera system and a centerline fuel tank, and by including features useful in extending the range, flight operations, and maintainability of the UAS, an improved UAS may be provided with the systems described herein.

BRIEF DESCRIPTION OF THE DRAWINGS

Advantages of the disclosed techniques may become apparent upon reading the following detailed description and upon reference to the drawings in which.

DETAILED DESCRIPTION OF SPECIFIC EMBODIMENTS

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
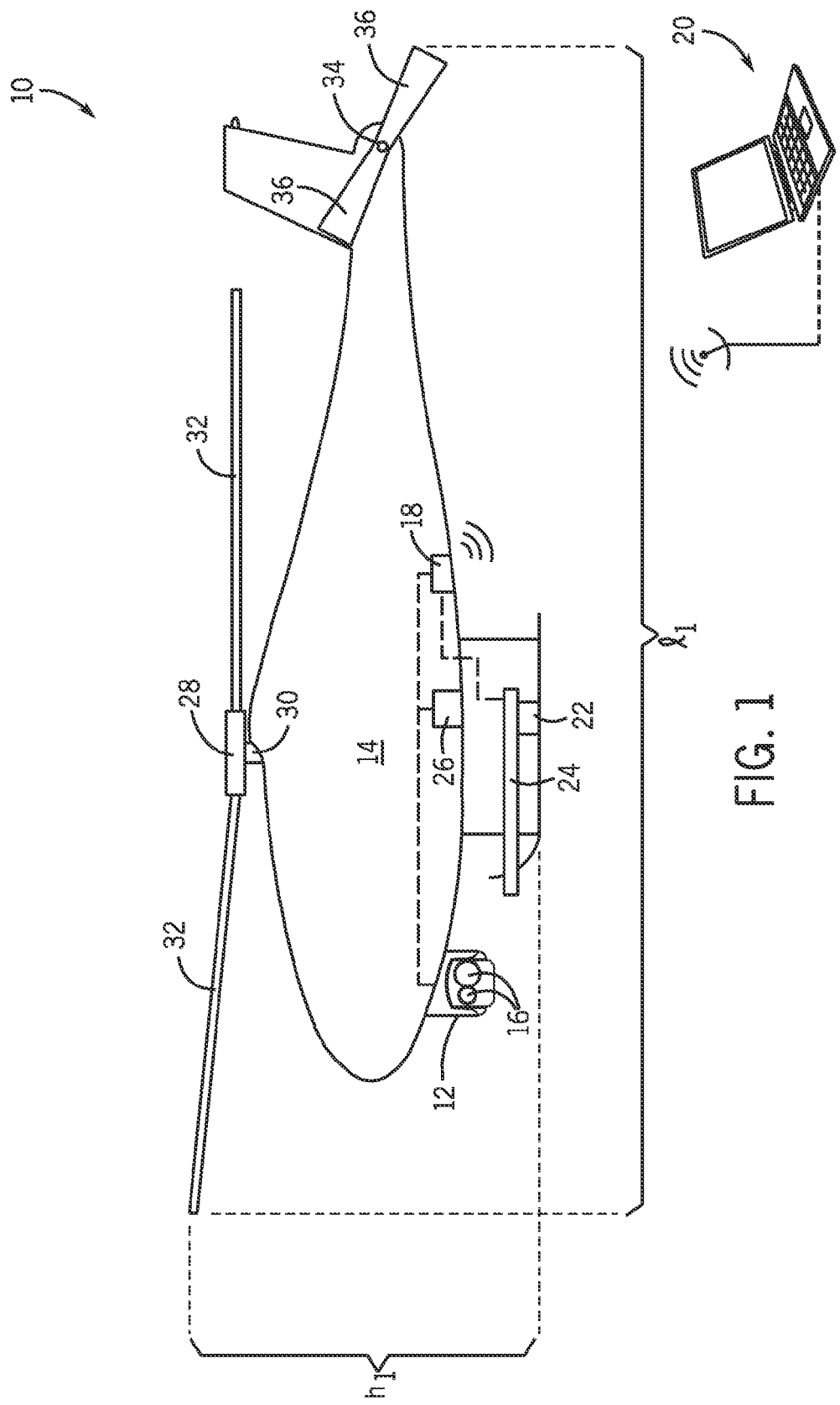
FIG. 1 is a perspective view of an embodiment of a UAS including a camera system.

FIG. 1 is illustrative of a UAS 10. While the UAS 10 represented in the figure is a helicopter system, aspects of this disclosure could be applied to other UAS 10, including fixed wing aircraft systems, quadricopters systems, tricopters systems, and the like. The application to a helicopter system is apt, however, insomuch as such helicopter system may be suitable for hovering flight, yet retain similar operational capabilities, e.g., speed, flight time, and flight performance, comparable to other aircraft systems.

In the depicted embodiment, a gimbal system 12 is mounted under a cowling or fuselage 14. The gimbal system 12 may be used in enclosing and operating a camera system 16, while the UAS 10 is in flight. For example, a remote operating system 18 may be used to pan, tilt, rotate, or otherwise position the camera system 16 to obtain imagery at a desired geographic location. Additionally, the remote operating system 18 and the camera system 16 may be used to remotely pilot the UAS 10, thus enabling the remote operator to be situated in a remote location different than the desired geographic location. The camera system 16 may include a variety of cameras, including cameras capable of high resolution imagery (e.g., 1080p video cameras), thermal imagery, forward looking infrared cameras (FLIR), laser radar (LADAR), synthetic aperture radar (SAR), and/or other imaging equipment. During flight, a UAS operator of the remote operating system 18 may receive imagery produced by the camera system 16, and use the imagery to remotely control the UAS 10.

In the illustrated embodiment, a flight station 20 suitable for transmitting and receiving signals (e.g., radio signals) may be communicatively coupled to the gimbal system 12 and to the camera system 16. Signals remotely transmitted from the remote operating system 18 may be received by the flight station 20 and used to control the camera system 16, as well as to operate the flight controls of the UAS 10. Signals transmitted from the remote operating system 18 may include imagery taken through the camera system 16 as well as operational data for the UAS 10 (e.g., speed, altitude, heading, engine data, fuel level, targeting data). Accordingly, the UAS operator may remotely fly the UAS 10, and operate the camera system 16 to capture desired imagery. Additionally, the UAS 10 may include a weapons mount 22 suitable for attaching a weapon, such as a kinetic weapon 24. The kinetic weapon 24 may deliver a kinetic payload (e.g., projectile), and may include a non-lethal weapon, such as an electroshock weapon (e.g., Taser), and/or a lethal weapon, such as a shotgun, rifled gun, or cannon. In other embodiments, a non-kinetic weapon, such as sonic weapon, high powered laser, and so on, may be used. It is to be noted that while the depicted embodiment shows one weapon 24 mounted onto the UAS 10 through the weapons mount 22, other embodiments may include multiple weapons 24.

As illustrated, the weapons mount 22 and weapon 24 may be communicatively coupled to the remote operating system 18. The UAS operator may aim the weapon 24 through the camera system 16 and engage a target. In the presently contemplated embodiment, the weapons mount 22 may be a fixed mount, and the weapon 24 may be pre-sighted for windage and elevation at a given range or ranges (e.g., 50 yards, 100 yards, and 200 yards). In this embodiment, the UAS operator may aim the weapon 24 by positioning the UAS 10 into a desirable targeting position. In other embodiments, the weapons mount 22 may be controllable through the remote operating system 18, and UAS operator may aim or move the weapon 24 independent of the movement of the UAS 10.

The UAS 10 may also include an autopilot and navigation system 26. For example, the autopilot and navigation system 26 may provide for supported and/or autonomous modes of flight control of the UAS 10. In the supported mode of operations, the autopilot and navigation system 26 may aid the UAS operator in flying the UAS 10. For example, while the UAS operator may generally direct the flight of the UAS 10, the autopilot and navigation system 26 may continuously monitor flight parameters (e.g., altitude, speed, gyroscopic parameters) and provide responsive adjustments to counteract effects due to, for example, wind shear, wind gusts, weapon 24 recoil, ground effects, and the like. In an autonomous mode of operation, the UAS operator may direct the UAS 10 to a certain geographic location, for example, by using geographic coordinates. The UAS 10 may then fly to the desired location under autonomous control. Accordingly, the autopilot and navigation system 26 may include a global positioning system (GPS), such as a differential global positioning system (DGPS) suitable for improved, sub-meter positional accuracy. Additionally or alternatively, the autopilot and navigation system 26 may be communicatively coupled to the camera system 16 (e.g., radar, video camera) for terrain avoidance and enhanced navigation.

In the depicted embodiment, the UAS 10 may include a size suitable for transport in a sports utility vehicle, a mid-size pickup truck, or comparably-sized vehicle. For example, the UAS 10 may include an overall length $l_1$ of less than 15 ft., a width $w_1$ of less than 3 ft., and height $h_1$ of less than 4 ft. Such compact dimensions enable the UAS 10 to be easily transported and deployed without the need for a custom transport vehicle. Indeed, the compact UAS 10 may be quickly positioned to observe locations of interest from an above-ground vantage point, thus providing for quick response during intelligence, surveillance, and reconnaissance (ISR) operations.

Also depicted is a shaft 30 rotatably coupled to a main rotor blade 32. The shaft 30 and provides a torquing force suitable for rotating the main rotor blade 32 during flight. Indeed, the blade 32 may be rotating at 500 revolutions per minute (RPM) or higher, thus creating lift and thrust. It is to be understood that, in other embodiments, the UAS 10 may include multiple blades 32. For example, 2, 3, 4 or more blades 32 may be used. A tail rotor 34 may also be used, including a tail rotor blade 36 which can counteract the torque created by the main rotor blade 32, thus useful in preventing the UAS 10 from spinning about the blade's 32 axis. It is to be noted that, while in the depicted embodiment the tail rotor 34 is shown portside on the UAS 10, in other embodiments the tail rotor 34 may be disposed starboard on the UAS 10.

It may be beneficial to minimize the weight of the UAS 10 while providing for improvements in the UAS 10 flight performance, such as operational range, speed, landing abilities, and weight distribution. The embodiments disclosed herein provide for an airframe having minimal weight. The reduction in weight may be accomplished by providing for airframe components that have multiple uses, in addition to manufacturing features useful in minimizing the weight of the components. For example, an airframe component may be used for structural support (e.g., adding rigidity to the airframe), for attaching other components, and as a load bearing platform for cameras, drive trains, and other UAS 10 subsystems. The airframe may also provide for additional features that improve fuel carrying capacity, maintenance, and flight performance of the UAS 10, as described in more detail below.

Figure 2:
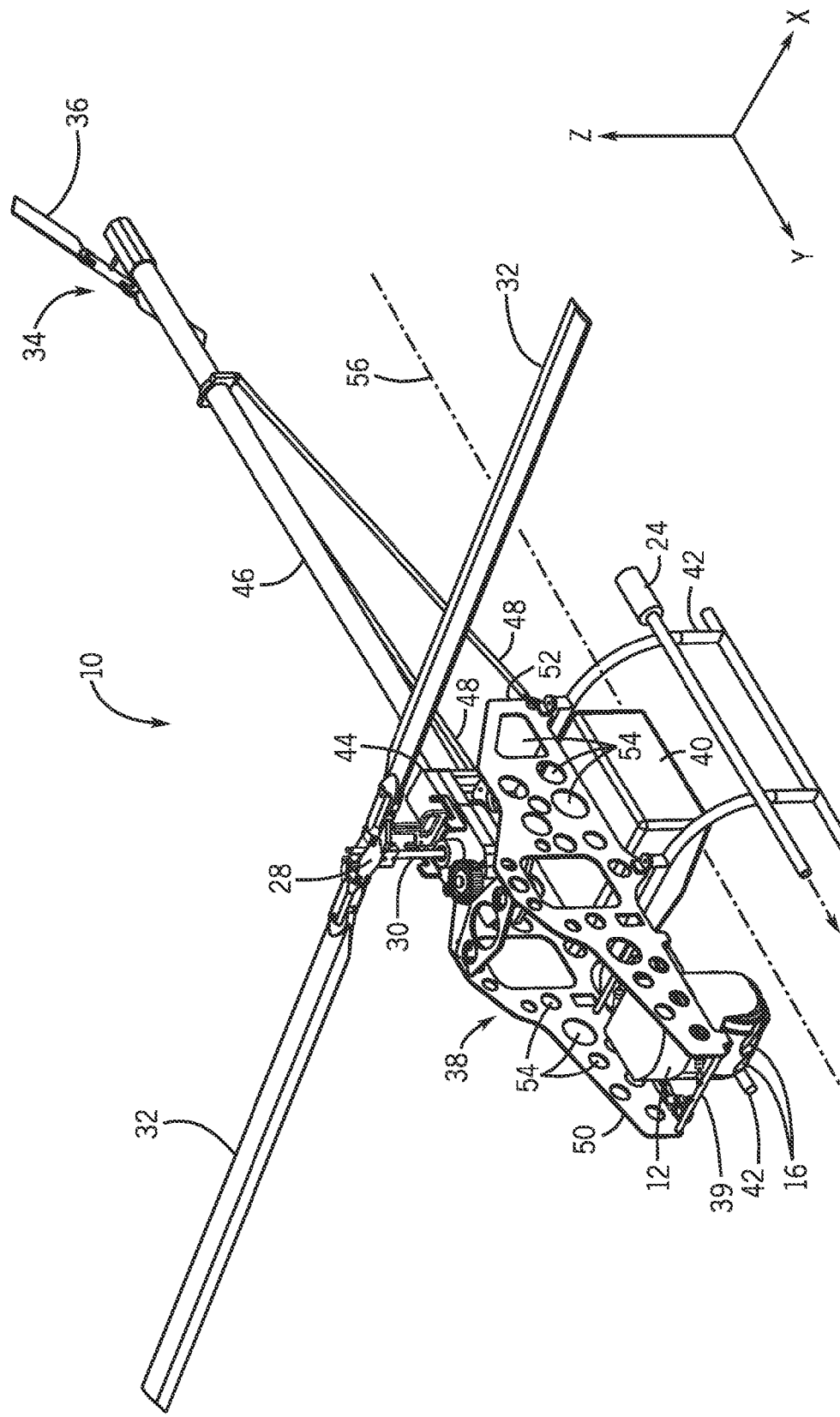
FIG. 2 is a perspective view of an embodiment of an airframe of the UAS of FIG. 1, with a camera mount and a fuel tank installed on the airframe.

With the foregoing in mind and turning now to FIG. 2, the figure depicts a perspective view of the UAS 10 with the cowling 14 removed, illustrating an airframe 38. Certain systems disclosed herein, such as the airframe 38 shown in FIG. 2, may include components useful in minimizing weight, improving weight distribution, and securely carrying UAS 10 subsystems, such as a support rod 39 coupled to the gimbal system 12 and included camera system 16. The airframe 38 may additional include features, useful in increasing fuel capacity with improved UAS 10 handling, such as a centerline fuel tank 40. Further, the airframe 38 may enable the attachment of a variety of landing systems, including a depicted pair of skids 42, suitable for takeoff and landing of the UAS 10 in a variety of environments.

Also illustrated are subsystems of the UAS 10, such as a drive train 44 used in driving the main rotor 28 and tail rotor 34. The drive train 44 may be positioned on the airframe 38 above the fuel tank 40, thus minimizing a distance for mechanically coupling the drive train 44 to the main rotor blade 32 and simplifying the components used in mechanical coupling the drive train 44 to the main rotor blade 32. The drive train 44 may be coupled to a piston engine, a turbine engine, an electrical engine, or a combination thereof. The tail rotor blade 36 may also be coupled to the drive train 44, for example, by using a shaft (not shown) enclosed within a tail boom 46. For additional support and rigidity, a pair of support arms 48 may be used to couple an aft section of the tail boom 46 to the airframe 38. The support arms 48 may enable the UAS 10 to perform a variety of flight maneuvers while minimizing or eliminating flexing of the tail boom 46.

The airframe 38 includes several additional features suitable for improving the flight performance of the UAS 10. For example, the airframe 38 includes a pair of "skeletonized" side walls 50 and 52 with multiple openings or through holes 54, useful in reducing weight. Indeed, the side walls 50 and 52 may each have approximately 40% less weight when compared to walls having no through holes 54. Additionally, the side walls 50 and 52 may be manufactured out of a lightweight material, such as carbon fiber, titanium, aluminum, chro-moly steel, or a combination thereof. By using "skeletonized" walls 50 and 52 manufactured out of low weight materials, flight duration may be increased by an additional 15 minutes or more due to the reduction in weight.

Additional features suitable for improving flight operations may include the fuel tank 40. In the depicted embodiment, the fuel tank is disposed along a centerline (e.g., bisecting line) 56 of the UAS 10 and may provide for increased fuel capacity (e.g., over 10 gallons of fuel) suitable for flight operations of over 3.5 hours. Traditional UAS 10 typically include fuel tank(s) mounted onto the skids 42 or otherwise attached onto the sides of the airframe 38 or fuselage 14. Such an arrangement may enable a quick removal and replacement of the side mounted fuel tank. However, the side mounted tank may lead to increased weight on one side of the UAS 10, especially as fuel is drained. The unbalancing of the UAS 10, may result in having to apply extra power with a corresponding increase in fuel usage in order to counteract the unbalancing. By way of contrast, the fuel tank 40 disclosed herein is attached along the centerline of the UAS 10, approximately towards the middle of the airframe 38 and under the drive train 44. Such positioning may provide a more balanced weight during flight operations, even as fuel is consumed. Indeed, the fuel tank 44 may enable the UAS 10 to maintain the same center of gravity as fuel levels decline during flight.

In the presently contemplated embodiment, the airframe 38 may weigh less than 7 lbs and provide for a load carrying capacity of over 45 lbs at a range of over 35 miles. Additionally, the airframe 38 may include a rigidity sufficient to withstand recoil from the weapon 24. Indeed, the airframe 38 may provide for a lifespan of at least 5000 flight hours and/or at least 150,000 rounds fired through the weapon 24. As mentioned above, the airframe 38 may minimize the weight of the UAS 10 by incorporating structural members of the airframe 38 that provide multiple functions, such as structural support functions, functions related to attaching components of the airframe 38, and functions related to carrying subsystems of the UAS 10, as described in more detail below with respect to FIG. 3.

Figure 3:
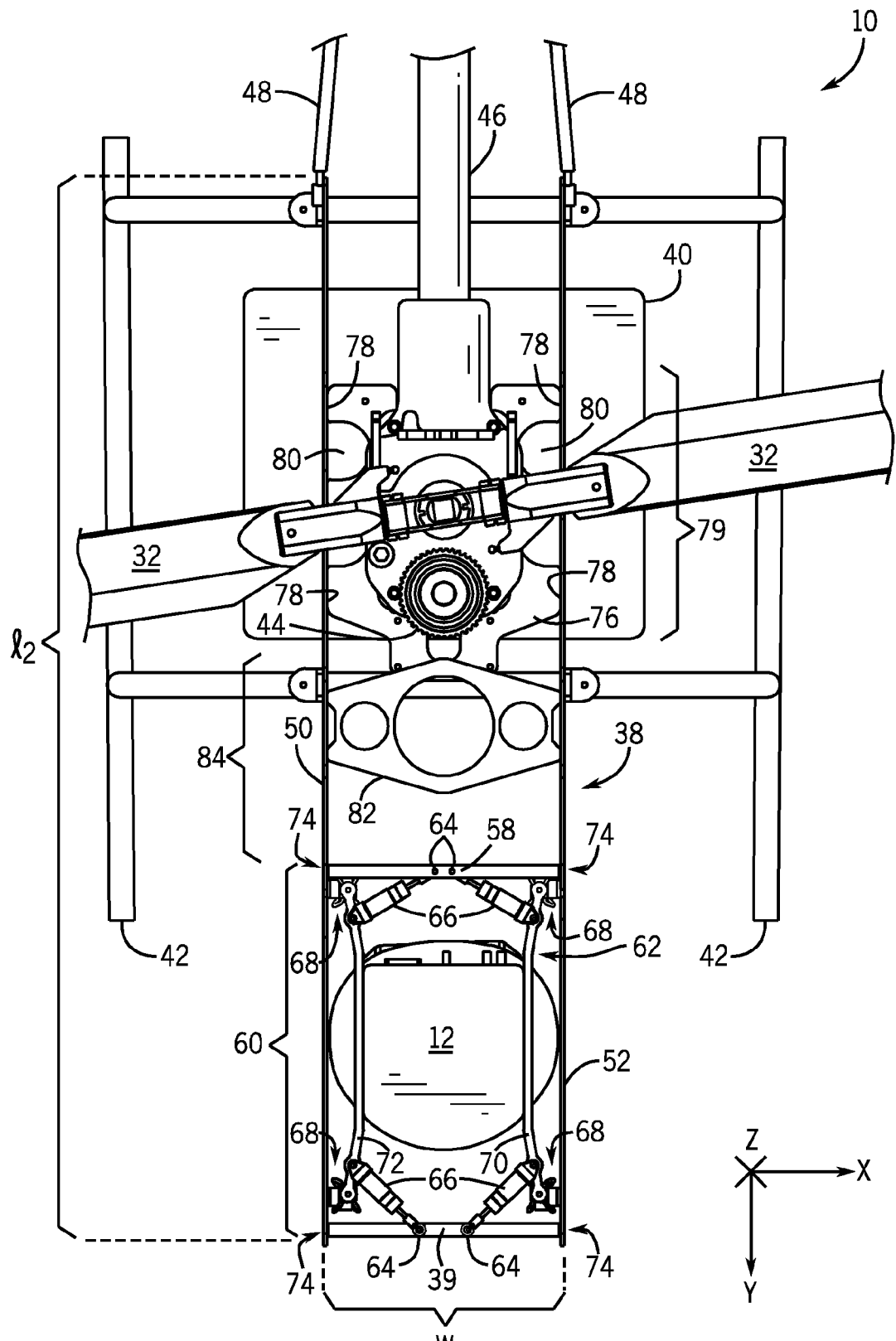
FIG. 3 is a top view of the airframe of FIG. 2, including the camera mounted onto structural members of the airframe.

FIG. 3 depicts a top view of the airframe 38 having a width $w_2$, length $l_2$, and including a first support rod 39, and a second support rod 58. The first and second support rods 39 and 58 may be used to provide multiple functions in the UAS 10. A first function of the 39 and 58 may include providing structural support to a forward section 60 of the airframe 38. That is, the rods 39 and 58 may provide for added rigidity in the forward section 60 of the airframe 38. Additionally, the two rods 39 and 58 may be used to mechanically connect a camera mount 62 to the airframe 38. Indeed, the rods 39 and 58 may include attachment points 64 useful in coupling the camera mount to the airframe 38. In one embodiment, the camera mount 62 may be used to carry the gimbal system 12 (and camera system 16) while providing for vibration dampening of the gimbal system 12 (and camera system 16) by including pistons 66 and springs 68 attached to axial arms 70 and 72. For example, the pistons 66, springs 68, and axial arms 70, 72 may be arranged as described in U.S. patent application Ser. No. 13/286,893 filed on Nov. 1, 2011 to Michael S. Buscher et al., which is hereby incorporated by reference in its entirety. Rather than bolting the camera mount 62 to a non-structural component of the airframe 38 (e.g., component added with the main function of attaching the camera mount 62), or to the skids 42, or fuselage 14 (shown in FIG. 1), the camera mount may be directly attached to the airframe's rods 39 and 58.

Further, the rods 39 and 58 may be used to aid in attaching the walls 50 and 52 to parallel to each other. In one example, threaded bolds may be inserted through openings 74 on the walls 50, 52, and secured onto threads disposed on the rods 39 and 58. In other examples, welds, adhesives, and the like, may be used to securely fasten the rods 39 and 58 onto the side walls 50 and 52. As mentioned with respect to the side walls 50 and 52, the rods 39 and 58 may be manufactured of a lightweight material, such as carbon fiber, titanium, aluminum, chro-moly steel, or a combination thereof. By providing for multiple functions for the rods 39 and 58, including structural support functions, fastening functions, and load bearing functions, the airframe 38 may reduce weight while increasing the operational effectiveness of the UAS 10.

Also depicted in FIG. 3 is a drive train platform 76 suitable for carrying the drive train 44, the main rotor 28, shaft 30, and the main rotor blade 32. The drive train platform 76 additionally provides for added functions, such as providing for attachment points 78 useful in securing the walls 50 and 52 parallel to each other. Further, the drive train platform 76 increased the rigidity of the airframe 38 in an aft section 79 of the airframe 38. As depicted, the drive train platform 76 is "skeletonized," and includes through-holes or openings 80 used to further minimize the weight of the UAS 10. In the presently contemplated embodiment, the drive train platform 76 is provided as a planar or "flat plate" for ease of manufacture and assembly.

A "skeletonized" support member 82 is also depicted. The support member 82 may also be provided as a planar or "flat plate," and may be used to attach the walls 50 and 52 generally parallel to each other at an approximate center forward section 84 of the airframe 38. Additionally, the support member 82 may provide added sturdiness to the airframe 38, thus resulting in stronger airframe 38 suitable for longer operational life with improved weapon recoil support. Indeed, the airframe 38 may enable an operational life of the UAS 10 of over 5,000 flight hours.

Figure 4:
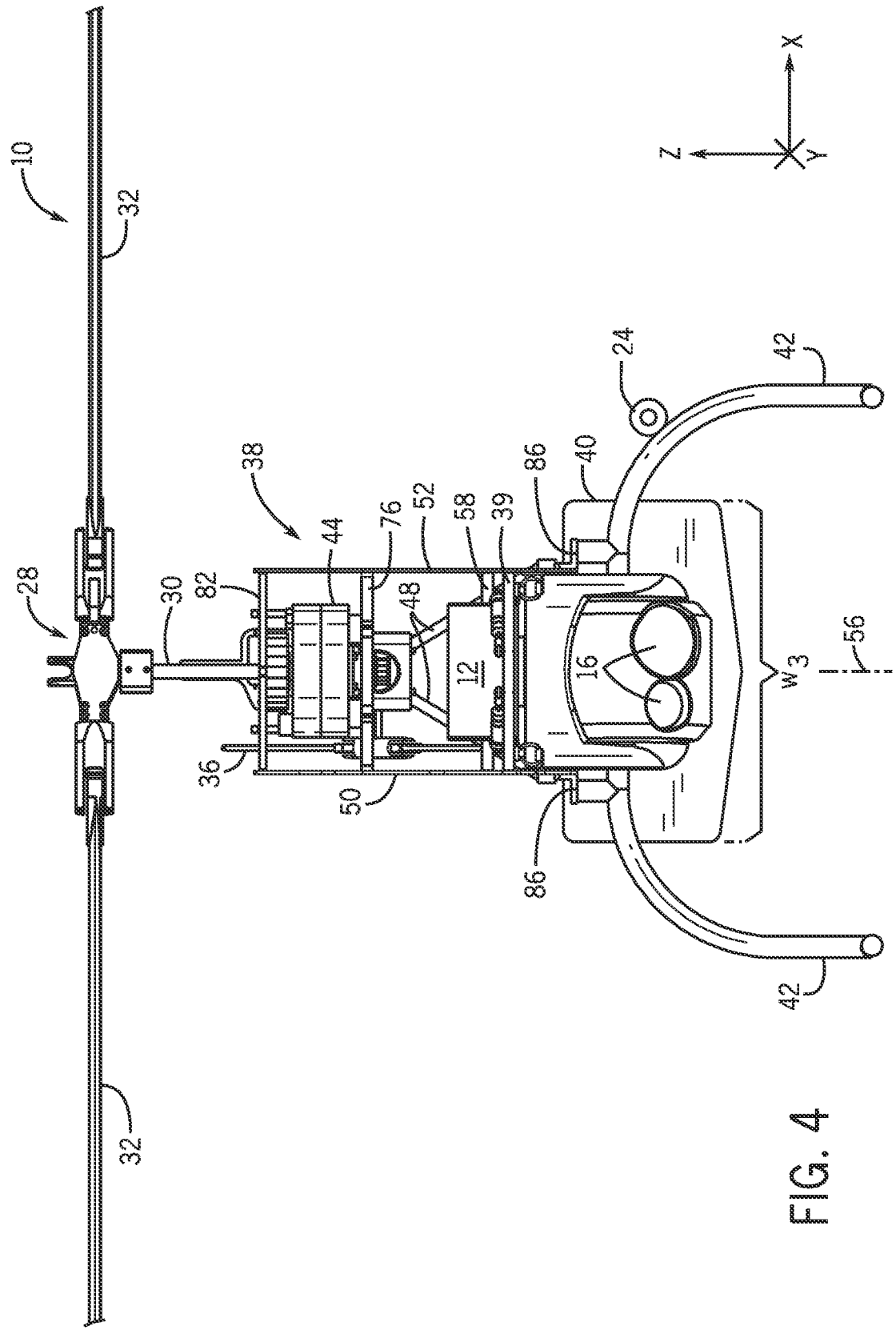
FIG. 4 is a is a frontal view of the airframe of FIG. 3, including a fuel tank.

FIG. 4 is a front view of the UAS 10 showing further details of the placement of certain components of the airframe 38. In the depicted embodiment, the support rod 39 is positioned below the support bar 58 with respect to the z-axis. In other examples, the support rods 39 and 58 may be positioned at an approximately equidistant distance with respect to each other in the z-axis. In yet another embodiment, the support rod 39 may be positioned above the support rod 58. Additionally, the support rods 39 and 58 may be repositionable with respect to the x, y, and z-axes to accommodate camera mounts 12 of differing sizes.

In the presently contemplated embodiment, the support member 82 is disposed above the drive train platform 76, and the drive train platform 76 is disposed approximately midcenter with respect to the z-axis of the walls 50 and 52. In certain embodiments, the drive train platform 76 may be repositionable in the x, y, and/or z-axes. For example, depending on the size of the shaft 30 and the drive train 44, and on the main rotor 28, and blade 22 configurations, the drive train platform 76 may be adjusted to provide for a desired positioning of the aforementioned components. For example, larger drive trains 44 may be accommodated by moving the drive train platform 76 closer to the fuel tank 40. By providing for adjustability of airframe 38 components, the systems described herein may enable a variety of configurations of the UAS 10, including configurations with different drive trains 44, rotors 28, blades 32, and camera mounts 12.

The airframe 38 also includes features, such as L-brackets 86, suitable for attaching a variety of landing systems. In the depicted example, the skids 42 are attached to the airframe 38 through the L-brackets 86. However, other embodiments may include pontoons suitable for water take-off and landings, or wheeled landing systems suitable for rolling take-off and landings. For ease of replacement, the skids 42 may be attached to the L-brackets 86 through threaded bolts. Accordingly, the bolts may be unthreaded and removed, and the skids 42 may then be replaced with pontoons, wheeled landing systems, and the like, increasing the operational flexibility of the UAS 10.

Also illustrated is the fuel tank 40 positioned along the centerline 56 of the UAS 10. By positioning the fuel tank 40 along the centerline 56, a more balanced weight distribution may be achieved. For example, as fuel is consumed, the UAS 10 will become lighter rather than more unbalanced when compared to fuel tanks positioned away from the centerline 56. Further, the placement along the centerline 56 may enable the fuel tank 40 to be replaced with a fuel tank 40 suited to specific mission objectives. For example, larger fuel tanks 40 may provide for a longer range. Because there is no airframe member constraining a width $w_3$ of the fuel tank, tanks wider than the width $w_2$ (i.e., width or distance between the side wall 50 and side wall 52) of the airframe 38 may be provided, having an increased fuel capacity. Indeed, in certain embodiments, the fuel tank 40 may provide for at least 20 gallons of fuel, suitable for over 5 hours of flight time. Other features of the fuel tank, such as a fuel line described in more detail with respect to FIG. 5, may also provide for enhanced flight operations.

Figure 5:
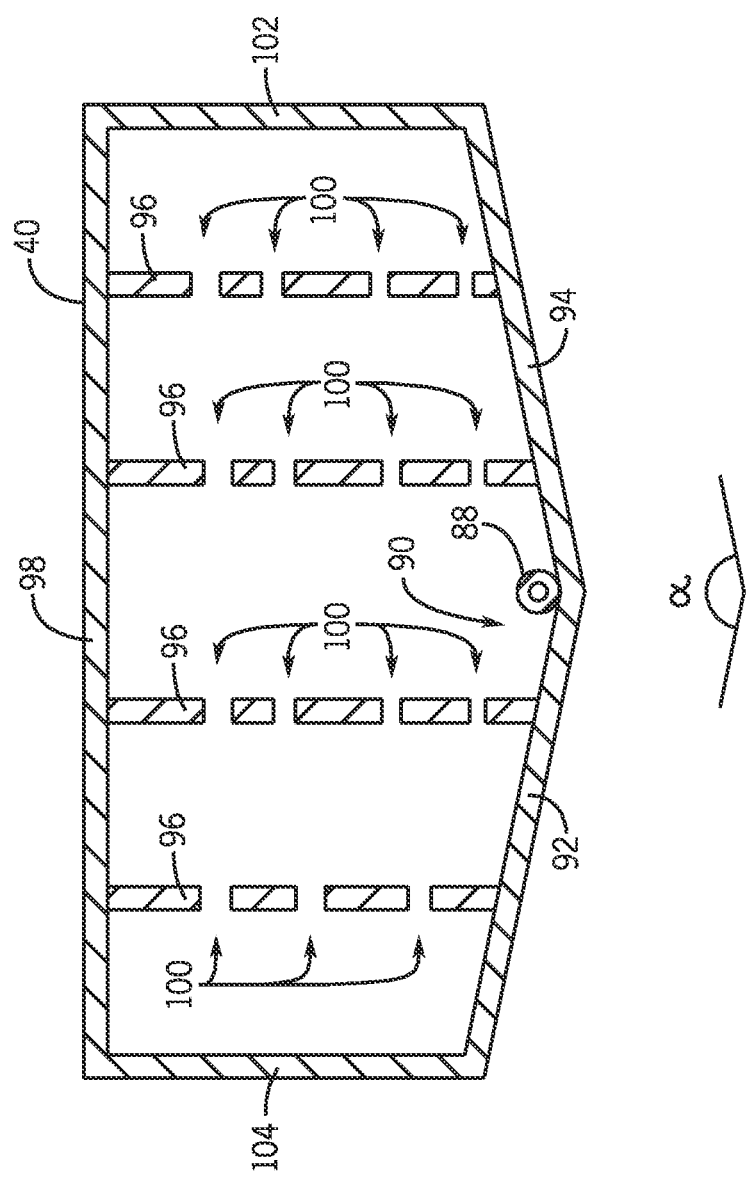
FIG. 5 is a cross-sectional view of the fuel tank of FIG. 4.

FIG. 5 is a cross-section view of an embodiment of the fuel tank 40, including a fuel line 88. In the depicted embodiment, the fuel line 88 is disposed within a trench 90 created by attaching two walls 92 and 94 at an angle $\alpha$, where $\alpha$ may be between 45° and 180°. By providing the walls 92 and 94 at the angle $\alpha$, fuel may pool in the trench 90. Accordingly, the pooled fuel may be more easily collected and directed to the power plant through the fuel line 88. Additionally, the fuel tank 40 may include multiple baffle plates 96. In the depicted example, the baffle plates 96 may have a height such that the baffle plates 96 extend between the walls 92, 94 to wall 98. In other examples, the baffle plates may include lesser heights, and only partially extend from the walls 92, 94 to the wall 98. The baffle plates 96 may include multiple openings or through holes 100 suitable for minimizing the "sloshing" of the fuel while providing for the transfer of fuel between the baffles 96.

The baffle plates 96 and walls 92, 94, 98, 102, and 104 may be manufactured out of a Kevlar, carbon fiber, aluminum, titanium, chro-moly steel, or combination thereof. Additionally, the fuel tank 40 may be provided in different sizes to accommodate different mission profiles. Accordingly, multiple mission profiles, such as long range (over 35 miles) profiles, short range profiles, high endurance profiles (over 3.5 hours aloft), fast time-to-location profiles, and so on, may be supported by selecting a fuel tank 40 having a desired size and fuel capacity. By providing for multiple features suitable for improving the operational performance and maintenance of the UAS 10, the airframe 38 may enable more improved UAS 10 suitable for longer flight times and faster deployment time.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An unmanned aircraft airframe system comprising:
a first planar side wall;
a second planar side wall positioned vertically parallel to the first planar side wall;
a drive train platform configured to carry an aircraft drive train and to attach the first planar side wall parallel to the second planar side wall;
a first structural rod configured to attach the first planar side wall vertically parallel to the planar second side wall; and
a second structural rod positioned aft of the first structural rod and configured to attach the first planar side wall vertically parallel to the second planar side wall, wherein the first and second structural rods are configured to carry a camera mount, wherein the first and the second structural rods are configured to provide rigidity to a forward section of the airframe system, wherein the first structural rod comprises a first piston attachment point and wherein the second structural rod comprises a second piston attachment point, wherein the camera mount is mounted onto the first structural rod via a first piston, and the camera mount is mounted onto the second structural rod via a second piston, and wherein the first and the second pistons do not extend past a cowling covering the unmanned aircraft airframe system.

2. The system of claim 1, wherein the first piston comprises a first shock absorber and the second piston comprises a second shock absorber.

3. The system of claim 1, wherein the drive train platform is configured to provide rigidity to an aft section of the airframe system.

4. The system of claim 1, comprising a support member disposed in a middle section of the airframe system between the second structural rod and the drive train platform, wherein the support member is configured to provide rigidity to a middle section of the airframe system.

5. The system of claim 1, wherein the plurality of holes openings comprise over one third a surface area of the first and the second planar side walls.

6. The system of claim 1, wherein the plurality of openings comprise openings having different diameters.

7. The system of claim 1, comprising a plurality of L-brackets, wherein the L-brackets are configured to removably couple a skid landing system, a pontoon landing system, a wheeled landing system, or a combination thereof, to the first and the second side walls.

8. The system of claim 1, wherein a liquid fuel tank is attached to the airframe system directly under the drive train platform and along a centerline between the first and the second side walls, and wherein the liquid fuel tank comprises a first tank wall positioned extending beyond the first planar side wall and a second tank wall positioned extending beyond the second planar side wall to define a tank width wider than a distance separating the first side wall from the second side wall.

9. The system of claim 4, wherein the drive train platform comprises a drive train mechanically coupled to a shaft and configured to rotate a blade via rotation of the shaft.

10. The system of claim 9, wherein the first and the second side walls comprise a length of between 24 inches and 52 inches, and wherein the airframe system weighs 7 pounds or less.

11. An unmanned aircraft system (UAS) comprising:
a liquid fuel tank comprising a first tank wall disposed opposite a second tank wall, wherein a first distance between the first and the second tank walls defines a tank width of the liquid fuel tank;
an airframe comprising:
a first planar side wall;
a second planar side wall positioned vertically parallel to the first planar side wall;
a drive train platform configured to support an aircraft drive train and to attach the first planar side wall to the second planar side wall;
a first structural rod configured to attach the first side wall vertically parallel to the second side wall; and
a second structural rod positioned aft of the first structural rod and configured to attach the first side wall vertically parallel to the second side wall,
wherein the liquid fuel tank is disposed completely underneath the drive train platform,
wherein the first tank wall is positioned extending beyond the a UAS canopy and the second tank wall is positioned extending beyond the UAS canopy,
wherein the tank width is wider than the UAS canopy, and
wherein the first and the second structural rods are configured to provide rigidity to a forward section of the airframe,
wherein the first structural rod comprises a first piston attachment point and
wherein the second structural rod comprises a second piston attachment point,
wherein a camera mount is mounted onto the first structural rod via a first piston, and the camera mount is mounted onto the second structural rod via a second piston, and
wherein the first and the second pistons do not extend past a cowling covering the airframe.

12. The system of claim 11, wherein the fuel tank comprises a third and a fourth tank walls coupled to each other at an angle of between 45 degrees and 179 degrees to form a fuel trench.

13. The system of claim 11, wherein the liquid fuel tank comprises means for protection against a projectile.

14. The system of claim 12, comprising a fuel line positioned in the fuel trench and disposed between the first and the second tank walls.

15. The system of claim 13, wherein the means for protection against the projectile comprise a plurality of baffled plates having a plurality of through-holes.

16. An unmanned aircraft system (UAS) comprising:
a landing system;
an airframe comprising:
a first planar side wall;
a second planar side wall positioned vertically parallel to the first planar side wall;
a drive train platform configured to support an aircraft drive train and to attach the first side wall vertically parallel to the second side wall;
a support member configured to provide structural support in a middle section of the airframe;
a first structural rod configured to attach the first planar side wall to the second planar side wall; and
a second structural rod configured to attach the first planar side wall to the second planar side wall, wherein the first and the second structural rods are configured to provide rigidity to a forward section of the airframe, wherein the first structural rod comprises a first piston attachment point, wherein the second structural rod comprises a second piston attachment point, wherein a camera mount is mounted onto the first structural rod via a first piston and the camera mount is mounted onto the second structural rod via a second piston, wherein the first and the second pistons do not extend past a cowling covering the airframe, and wherein the landing system is attached to the first and to the second planar side walls.

17. The system of claim 16, comprising a weapon and a liquid fuel tank, wherein the landing system comprises:
a first skid support member disposed fore of the liquid fuel tank;
a second skid support member disposed aft of the liquid fuel tank;
a first skid positioned perpendicular to the first and second skid support members and attached to the first and second skid support members, wherein the first skid is configured to contact a ground during landing; and
a second skid positioned perpendicular to the first and second skid support members and attached to the first and second skid support members, wherein the second skid is configured to contact the ground during landing, wherein the weapon is attached to the first and second skid support members.

18. The system of claim 16, wherein the landing system comprises skids, pontoons, wheels, or a combination thereof.

19. The system of claim 16, comprising a plurality of L-brackets configured to attach the landing system to the first and to the second side walls.

* * * * *